United States Patent Office 3,428,355
Patented Feb. 18, 1969

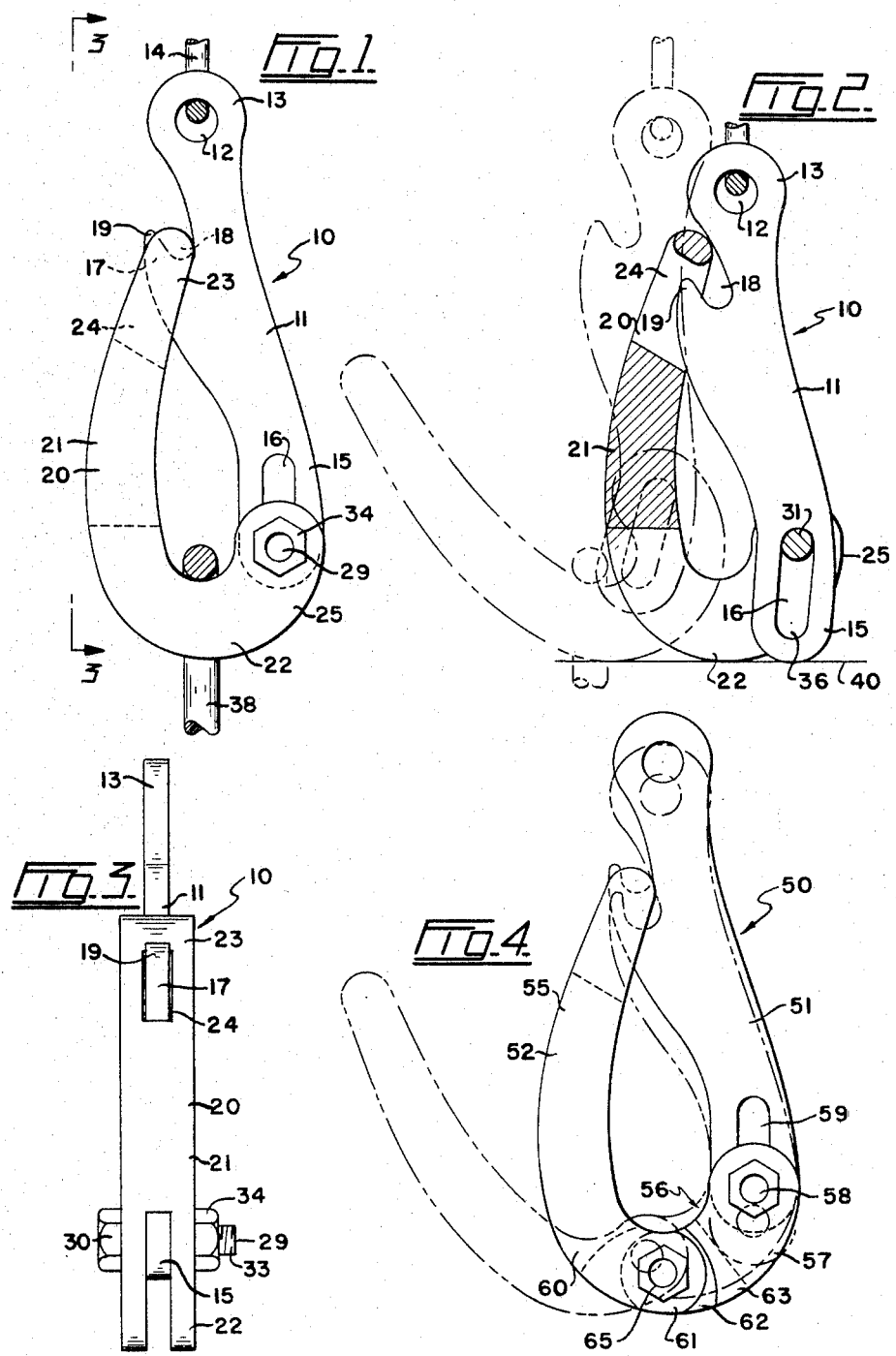

3,428,355
SAFETY HOISTING HOOK
Alexander Hamilton, 4871 Union St., Burnaby,
British Columbia, Canada
Filed Dec. 26, 1967, Ser. No. 693,479
U.S. Cl. 294—82                                    6 Claims
Int. Cl. B66c 1/34

ABSTRACT OF THE DISCLOSURE

A safety hoisting hook having a vertical shank member and a swinging hook slidably and pivotally secured at the lower end of the shank member for swinging movement between an open and a closed position, the swinging hook having an eye formed at its bill end adapted to receive a projection on the shank member so as to maintain the hook in a closed position. Movement of swinging hook upwardly relative to the shank member to clear the projection permits the swinging hook to swing to an open position.

Background of the invention

This invention relates to hoisting hooks in general and more particularly, to the type known as safety hoisting hooks.

Safety hoisting hooks, of prior design, have usually employed a shank which is connected at one end to a cable or the like and a swinging hook pivotally and slidably mounted on the shank, swingable between open and closed positions. The swinging hook is usually mounted at a point somewhat intermediate of the length of the shank member and is so formed so that it may be lockably engaged with a locking element at the lower or other end of the shank member. In this type of safety hook the swinging hook is usually slid upwardly along the shank member in order to disengage the bill from the locking element to allow the swinging hook to swing to an open position.

Safety hooks constructed in this manner are usually stronger than the normal open hooks as they are supported at their bill ends thereby preventing straightening out of the hook under heavy loads, however, once they are arranged in their closed position they can be operated to an open position only with the employment of an operating element extraneous to the hook itself. In most cases where the load must be lifted or lowered a considerable distance, the operating element cannot be operated by the operator of the hoisting equipment and therefore requires the employment of a man at the unloading site in order to effect disengagement of the hook and the load.

Summary of the invention

The design of the safety hoisting hook of the present invention enables the hoist operator to disengage the hook from its load after the latter has been lifted or lowered to its unloading site by simple operation of the hoisting cable alone without the intervention of any extraneous operating device or without direct manual operation by someone at the loading site.

The safety hook of the present invention comprises a vertically elongated shank member having an upwardly and laterally extending projection located above its lower end, a swinging hook having a bill, means for pivotally and slidably connecting the swinging hook to the shank member below the projection for swinging movement between opened and closed positions, latch means at the bill end of the swinging hook for lockably engaging the projection when the swinging hook is arranged in its closed position said means being adapted to permit slidable upward movement of the swinging hook along the shank member to a position in which the latch means is clear of the projection to permit the swinging hook to swing to its open position.

Brief description of the drawings

FIGURE 1 is a side elevation of one embodiment of the invention with the swinging hook in a closed position, FIGURE 2 is another side elevation, partially in section, of the embodiment illustrated in FIGURE 1 with the swinging hook illustrated, in solid lines, in a position about to be opened and in dotted lines in an open position, FIGURE 3 is a end view of FIGURE 1 taken in the direction 3—3 thereof, FIGURE 4 is a side elevation of another embodiment of the invention with the swinging hook shown, in solid lines, in the closed position, and in dotted lines, in an open position.

Description of the preferred embodiments

Referring to FIGURES 1, 2 and 3, one embodiment 10 of the invention is illustrated. Safety hook 10 comprises an elongated shank portion 11 made of flat steel stock having a circular aperture 12 formed at one end 13 through which a ring 14 or the like is passed whereby the shank may be suspended in a substantially vertical position from a hoisting cable, not shown. Adjacent its other end 15 there is formed in the shank portion 11, a substantially vertical elongated slot 16.

The shank portion 11, at one edge 17 thereof, has an upwardly opening seat or slot 18 formed therein just below the aperture 12. This seat or slot 18 results in the formation of an upwardly and laterally extending horn shaped projection 19.

To the shank portion 11 is swingably and slidably secured a swinging hook 20. This swinging hook has an elongated bill portion 21 and a crook portion 22. The bill portion 21 has formed, near its free end 23, an eye 24 which is of sufficient size as to permit the insertion of the projection 19 therethrough.

The crook portion has a bifurcated free end portion 25 into which the end 15 of the shank slidably and rotatably fits.

A bolt 29 having a head 30 and shank 31 is passed through suitable apertures not shown, formed in the bifurcated free end portion 25 of the crook 22 and through the slot 16 in the shank portion 11. The diameter of the shank 31 of the bolt is such as to provide a snug yet slidable and rotatable fit in the slot 16. The shank 31 is provided with a threaded end section 33 over which a nut 34 is tightened.

With the parts of the safety hoisting hook 10 so far described, it will be seen that in the closed position, see FIGURE 1, with the shank 31 of the bolt 29 located at the lower end 36 of the slot 16, the projection 19 will extend through the eye 24 so as to permit the bill portion 21 of the swinging hook to rest thereon. The weight of any load suspended by means of a ring or cable 38 engaged with the crook 22 of the swinging hook 20 will therefore be divided between two points of support, thereby providing a hook much stronger than the conventional hook. Furthermore, if the bolt 29 should break, the engagement of the projection 19 in the eye 24 will prevent disengagement of the swinging hook 20 with the load.

The length of the slot 16 is such that when the swinging hook is moved upwardly along the shank portion 11 to position the bolt 29 at the upper end of said slot 16, as shown in solid lines in FIGURE 2, the eye 24 will be moved upwardly to a position in which the bill portion is clear of projection 19. The swinging hook may then be moved manually to an open position to permit disengagement of the hoisting hook with the load.

If it is desired to operate the swinging hook between a closed and an open position without manually doing so, the operator of the hoist with which the swinging hook is associated simply needs to lower the swinging hook until the crook 22 rests on a supporting surface 40. The shank portion 11 will move downwardly relative to the swinging hook 20 until the bolt 29 is adjacent the upper end of the slot 16. This will result in a withdrawal of the projection 19 from the eye. Due to the elongated aspect of the bill portion 21 of the swinging hook, and as its centre of gravity is to one side of the point of support or engagement with the supporting surface 40, the swinging hook will roll away from the shank portion to a position as shown in dotted lines in FIGURE 2. The shank portion 11 is then lifted permitting the swinging hook 20 to swing to an open position.

Another embodiment 50 of the invention is illustrated in FIGURE 4. Hoisting hook 50 is very similar to hoisting hook 10 having a shank portion 51 which is identical to shank portion 11 and a swinging hook 52 which has elongated bill 55, and a crook 56 having a bifurcated end portion 57 which fits the lower end of the shank to which it is pivotally connected by a bolt 58 passing through a slot 59 formed in said lower end of said shank 51.

The swinging hook 52 is hingedly articulated at the middle point of the crook 56, one portion 60 of the bill 55 being bifurcated at one end 61 thereof to rotatably receive the free end portion 62 of the other portion 63 of the crook. Both portions 60 and 63 are hingedly connected by means of a bolt 65 passed transversely through their respective end portions.

The operational characteristics of hoisting hook 50 and hoisting hook 10 are quite similar. Hook 50, however, due to the hingedly articulated crook 56 will automatically open much more readily than hook 10 and when in its open position, as illustrated in FIGURE 4, and can never return to its closed position on its own but must be closed by a workman at the loading site.

I claim:

1. A safety hoisting hook comprising a vertically elongated shank member having an upwardly and laterally extending projection located above its lower end, a swinging hook having a bill, means for pivotally and slidably connecting the swinging hook to the shank member below the projection for swinging movement between open and closed positions, latch means at a bill end of the swinging hook for lockably engaging the projection when the swinging hook is arranged in its closed position, said latch means being adapted to permit upward movement of the swinging hook along the shank member to a position in which the latch means is clear of the projection to permit the swinging hook to swing to its open position.

2. A safety hoisting hook as claimed in claim 1 in which the swinging hook has a rounded crook portion and an elongated bill portion extending therefrom, said bill portion having its centre of gravity offset from the centre of the crook so as to rotate the swinging hook towards an open position when the crook is rested upon the supporting surface.

3. A safety hoisting hook as claimed in claim 2 in which the crook portion is hingedly articulated to permit said bill portion to swingably gravitate to an open position when the latch means is clear of the projection.

4. A safety hoisting hook comprising a vertically elongated shank member having an upwardly and laterally extending projection located above its lower end and having a substantially vertical slot formed therein adjacent its lower end, a swinging hook bifurcated at one end fitting over the lower end of the shank member, a connecting bolt passed through the bifurcated end of the swinging hook and through the slot so as to permit swinging and slidable movement of the swinging hook relative to the shank member between open and closed position, an eye in the bill end of the swinging hook through which the projection lockably extends when the swinging hook is in its closed position, said swinging hook being slidable along the shank member to a position in which the eye is above and clear the projection so as to permit the swinging hook to swing to its open position.

5. A safety hoisting hook as claimed in claim 4 in which the swinging hook has a rounded crook portion and an elongated bill portion extending therefrom, said bill portion having its centre of gravity offset from the centre of the crook so as to rotate the swinging hook towards an open position when the crook is rested upon a supporting surface.

6. A safety hoisting hook as claimed in claim 5 in which the crook portion is hingedly articulated to permit said bill portion to swingably gravitate to an open position when the eye is clear of the projection.

References Cited

UNITED STATES PATENTS

| 669,382 | 3/1901 | Carter | 24—238 |
| 1,725,609 | 8/1929 | Amos | 24—242 |
| 2,158,372 | 5/1939 | Long | 294—82 |
| 2,561,017 | 7/1951 | Garrison | 24—232 |

ANDRES H. NIELSEN, *Primary Examiner.*

U.S. Cl. X.R.

24—232